United States Patent [19]

Liao et al.

[11] Patent Number: 5,582,807
[45] Date of Patent: Dec. 10, 1996

[54] METHOD AND APPARATUS FOR REMOVING PARTICULATE AND GASEOUS POLLUTANTS FROM A GAS STREAM

[75] Inventors: Chung F. Liao, Kingwood, Tex.; Mark A. Siddoway, Destrehan, La.

[73] Assignee: TEK-KOL, LaJolla, Calif.

[21] Appl. No.: 334,595

[22] Filed: Nov. 4, 1994

[51] Int. Cl.⁶ .......................... B01D 53/50; B01D 53/78; B01D 47/06
[52] U.S. Cl. ................. 423/210; 423/215.5; 423/243.01; 95/230; 95/235
[58] Field of Search ................................. 423/210, 215.5, 423/243.01, 242.1; 95/230, 235

[56] References Cited

U.S. PATENT DOCUMENTS

| | | | |
|---|---|---|---|
| 1,377,594 | 5/1921 | Lissauer . | |
| 2,186,125 | 1/1940 | Roberts | 183/22 |
| 2,579,282 | 12/1951 | Vicard | 183/29 |
| 3,948,608 | 4/1976 | Weir, Jr. | 23/284 |
| 3,957,464 | 5/1976 | Teller | 55/68 |
| 4,102,982 | 7/1978 | Weir et al. | 423/242 |
| 4,269,812 | 5/1981 | Edwards et al. | 423/242 |
| 4,345,916 | 8/1982 | Richards et al. | 55/5 |
| 4,374,813 | 2/1983 | Chen et al. | 423/242 |
| 4,401,444 | 8/1983 | Teller | 55/20 |
| 4,487,615 | 12/1984 | Taylor et al. | 55/84 |
| 4,810,268 | 3/1989 | Chambers et al. | 55/84 |
| 5,039,315 | 8/1991 | Liao et al. | 55/90 |
| 5,439,509 | 8/1995 | Spink et al. | 95/166 |

*Primary Examiner*—Gary P. Straub
*Assistant Examiner*—Timothy C. Vanoy
*Attorney, Agent, or Firm*—Polster, Lieder, Woodruff & Lucchesi, LC

[57] ABSTRACT

An apparatus and method for removing particulate and gaseous pollutants from flue gas. The flue gas enters a presaturation section and is treated with a coarse spray of solution recovered from the system. The saturated gas enters a primary contacting section and is contacted by an ultrafine mist of fresh solution containing a gaseous pollutant absorption agent. The fine mist has an average droplet size of approximately 20 microns. The gas moves to a secondary contacting section where it is contacted by a coarse spray of recirculated solution. If necessary, the gas is demisted. Finally, the gas is discharged into the environment. Usable spent solution is regenerated and reused. Unusable water byproducts containing contaminants are discharged.

12 Claims, 3 Drawing Sheets

METHOD AND APPARATUS FOR REMOVING PARTICULATE AND GASEOUS POLLUTANTS FROM A GAS STREAM

BACKGROUND OF THE INVENTION

This invention relates to flue gas conditioning, more particularly to a method for removing particulate and gaseous pollutants from flue gas using very fine mists of gas absorbing solution prior to discharge of the gas into atmosphere.

Generally, several methods of removing particulates from a gas stream are known. One method employs the use of electrostatic precipitators to precipitate electrically charged particles out of a gas stream. Electrostatic precipitators, however, require large quantities of energy and present safety problems.

Another method of removing pollutants uses impinging devices which provide barriers or packing to impinge on gas flow. As the gas moves through the system the particulates impact the obstructions and drop out of the gas stream. These devices are unsatisfactory, however, because the particulates collect in the packing and cause plugging and waste removal problems.

The most common method of treating flue gas to remove pollutants includes spraying water or mist onto the gas stream to suppress the particulate matter. Various types of these devices, known as wet scrubbers, are in wide use. Scrubbers have a major drawback in that their operation requires considerable energy. Furthermore, the conventional wet scrubber consists of pressure nozzles that produce droplets in the size range of several hundred microns. Droplets of that size are ineffective in capturing the respirable-size particulates contained in normal contaminates. The larger the size of the mist, the less effective surface area of treating liquid is provided. A surface area of a given amount of sprayed solution is: area=$A=(3V)/(R)$, where V is the amount (volume) of solution sprayed and R is average diameter of the mists. Therefore, a finer (or smaller) mist increases the surface area of a given volume of solution sprayed.

Several prior art methods have been used to enhance the contact between the gas and the treating liquid. Generally these methods involve taking a large overall pressure drop of the flue gas. These methods include using a venturi with a pressure drop of 30 inches of water column or more or by bubbling the gas through a series of solution baths staged throughout the system. These methods are inefficient because the entire gas stream must be compressed to accomplish the contacting U.S. Pat. No. 5,039,315 to Liao, et al. provides a method and apparatus for separating particulates from a gas stream. Other, relevant patents include U.S. Pat. Nos. 4,810,268, to Chambers et al; 4,401,644 to Teller; 4,345,916 to Richards et al; 4,269,812, 4,343,771, and 4,102,982 all to Edwards et al; 3,957,464, to Teller; 3,948,608 to Edwards et al; and 2,579,282, to Vicard.

All of the aforestated methods have another notable drawback. The methods may remove large particulate matter but are not as effective for the removal of small particulate matter, down to about five microns, or gaseous pollutants from the gas stream.

SUMMARY OF THE INVENTION

It is among the principal objects of the present invention to provide a method and apparatus for removing particulates in gaseous pollutants from flue gas prior to release of the gas into the environment.

Another object of the present invention to provide a method for removing particulate and gaseous pollutants in which the gas is contacted with a solution containing an absorption agent.

It is another object of the present invention is to provide a method and apparatus for removal of particulate and gaseous pollutants from a gas stream in which the contact solution is recovered and recirculated to conserve solution and energy.

Still another object of the present invention is to provide a method and apparatus for the removal of particulate and gaseous pollutants from a gas stream in which the gas is contacted with an ulltrafine mist to provide large surface area to enhance the gas absorptive capacity of the solution.

A still further object of the present invention is to provide a method and apparatus for the removal of particulate and gaseous pollutants from the gas stream which uses a twin fluid atomizer in which air and solution are mixed in a nozzle to create an ultrafine mist, with the majority of the mist sizes being less than fifty microns, and the average mist size being less than twenty microns.

Another object of the present invention is to provide a method and apparatus for removal of particulate and gaseous pollutants from a gas stream that can be retrofitted to existing systems requiring flue gas conditioning.

In accordance with the invention, generally stated, a method and apparatus for removing particulate and gaseous pollutants from a gas stream is provided in which the gas, containing the particulates and gaseous pollutants, is presaturated in a presaturation section by contact with a coarse spray of recirculated solution to reduce the incoming gas to the water dewpoint and saturate the gas with water. The gas is then contacted with an ultrafine mist of fresh solution in a primary contacting section. The ultrafine mist provides a large surface area which enhances the gas absorptive capacity of the solution. The ultrafine mist is generated by one or more twin fluid atomizers wherein air and solution are mixed in a nozzle to create the ultrafine mist. The majority of mist droplets are less than fifty microns in diameter. The average mist size is twenty microns. The gas moves to a secondary contacting area wherein the gas is contacted with a coarse spray of recirculated solution. Finally, the gas moves through a demister, if necessary, to remove any entrained mists prior to discharge into the environment. Usable solution is recovered and recirculated to the presaturation section and the secondary contacting area. Fresh solution is injected into the system at the primary contacting section to provide additional absorption agent. Unusable spent solution is continuously bled to withdraw spent absorption agent and collected particulates. Makeup water can be added to the recirculated solution or to the fresh solution.

DESCRIPTION OF THE PREFERRED EMBODIMENT

Figure 1:
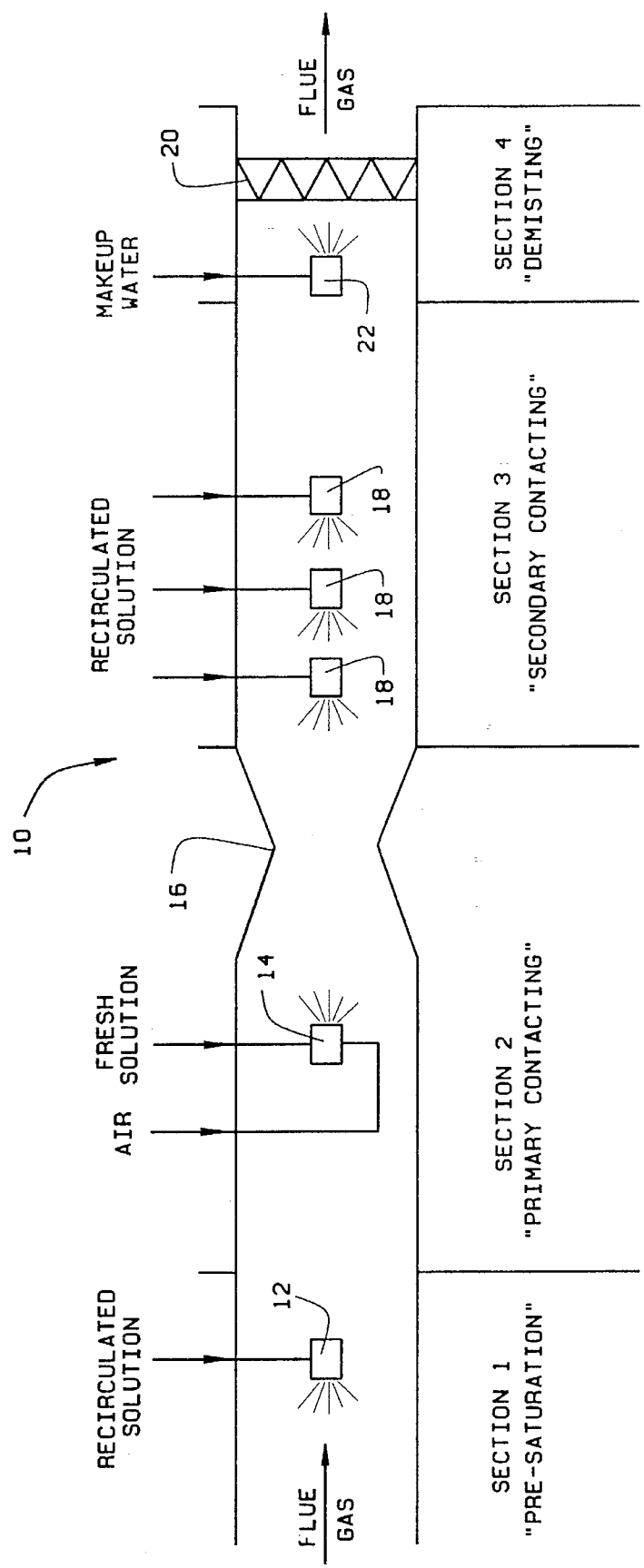
FIG. 1 is a schematic of the method and apparatus of the present invention.

FIG. 1 contains an overall schematic of the present invention. The system, indicated generally by reference numeral 10, is divided into four sections. The sections include a presaturation section, a primary contacting section, secondary contacting section, and a demisting section. Each of the sections, as illustrated in FIG. 1, will be described in greater detail hereinafter.

Section 1 is the presaturation section. In this section the gas is treated with water to be saturated to the dew point. This can be accomplished by spraying the gas with fresh or waste water. Section 1 employs a plurality of conventional nozzles, properly aimed upstream, as shown. Nozzles 12 produce a relatively coarse mist. The preferred method, however, is to contact the gas with recirculated solution or waste water captured from the system, as will be described below. The purpose of the section 1 is to presaturate the gas with water so little or no evaporation takes place in the primary contacting section. Without the presaturation section, water used to dispense the absorption agent in the primary contacting section will evaporate, retarding the ability of airborne pollutants to react with the absorption agent. The presaturation section 1 also cools the gas.

Section 2 is the primary contacting area. Fresh solution is used to treat the gas. The fresh solution contains an absorption agent, such as sodium carbonate or sodium hydroxide. In section 2, an ultrafine mist is created via one or more twin fluid atomizers 14. The finely divided mist rapidly absorbs the gaseous pollutants and creates a waste solution having particulate agglomerates. As stated above, the fine mist created by the twin fluid atomizers 14 provides a large surface area of mist which enhances the gas absorption ability of the method and apparatus. The surface area of a given amount of solution that is sprayed is calculated using the following equation: area=$A=(3\times V)/R$, where V is the volume of solution sprayed and R is the average diameter of the mist droplets. Therefore, a finer mist i.e. smaller R, increases the surface area for a given volume of solution sprayed. In section 2, the rate of gaseous pollutant absorbed also can be described by a mass transfer coefficient, multiplied by surface area, multiplied by a driving force. The driving force is the concentration of the pollutant in the gas phase since the reaction with the absorption agent is rapid compared to the mass transfer.

At the twin fluid atomizers 14, air and solution are mixed in a nozzle to create an ultrafine mist. The majority of the mist droplets created are less than fifty microns in diameter. Generally, the average mist droplet size obtainable is twenty microns in diameter. The twin fluid atomizer 14, by utilizing the action of compressed air and water, creates an ultrafine mist with a larger nozzle orifice while utilizing a relatively low pressure, i.e. less than 100 psi. Since a good hydraulic nozzle produces a spray with an average mist droplet size of about 100 microns, and the twin fluid atomizers used in section 2 create a mist having average mist droplets sizes of approximately 20 microns, the rate of gas absorption in section 1 is enhanced, at least by a factor of fifty, using the twin fluid atomizing nozzle.

As can be seen in FIG. 1, a slight constriction 16 is used in section 2 to insure good mist/gas contacting. Constriction 16 allows an overall pressure drop on the order of 1 to 2 inches of water column.

Section 3 is the secondary contacting area. In section 3, the gas is contacted with relatively large or coarse mists created by a plurality of conventional hydraulic nozzles 18. Such mist droplets would be on the order of 100 microns. This section may contain banks of nozzles 18 or stages of spraying. The solution provided through the sprayers in section 3 is recirculated solution captured from section 2. The use of the recirculated solution enhances the total utilization of the absorption agent in the solution, decreases energy consumption, and conserves water.

Section 4 is the demisting area. One or several stages of demisting can be used at this stage. The demisters 20 are conventional and can be either chevrons or demister pads or a combination thereof. In general, water washing of the demister pads is required. Thus each demister stage will have cleaning sprays 22. Sprays 22 can supply makeup water to the system to maintain an appropriate volume of recirculated solution. Cleaning sprays 22 generally are pulsed on or off as determined by either a detected need for water washing or by a timing mechanism. After demisting, the flue gas can be released into the environment.

There are some notable variations to the method and apparatus described above. First, section 1 can be eliminated by supplying excess water in the fresh solution used in section 2, the primary contacting section. In general, it is preferred, and the process more easily controlled, simply to use coarse hydraulic nozzles 12 in section 1 as previously described.

Second, sections 2 and 3 can use a variety of different atomizer arrangements. The atomizers 14 can be attached to the vessel wall or suspended directly in the gas phase. Although, in the preferred embodiment, the twin fluid atomizers 14 creating very fine mists are used in section 2, it is possible to use a second bank of twin fluid atomizers in section 3 (not shown). The recirculated solution then would be provided in a smaller mist size, for example twenty to fifty microns, to increase the surface area of recirculated solution provided in section 3.

Third, demisting can take place in several sections of the unit depending upon the desired result. For example, an upstream or first water system could be used to remove particulates. The gas would be demisted and proceed down stream. Downstream a second system, employing twin fluid atomizers, would treat the gas with ultrafine mists containing an absorption agent to remove the gaseous pollutants. The water containing particulates from the first system can be recaptured and the particulates removed. The spent water can be mixed with an absorption agent and then incorporated into the second system.

Furthermore, the nozzles and atomizers as shown in sections 1, 2, and 3 can be oriented to spray either upstream or downstream. In general, to enhance mixing, nozzles 12 in section 1 should be pointed upstream, as shown. This configuration sprays the solution containing absorption agent into the incoming gas stream and washes off particulate buildup on nozzle 12 as the gas passes by. In general, therefore, it appears optimal to use nozzles 12 spraying into the gas stream in section 1, the presaturation stage. Atomizers 14 in section 2, however, should be targeted downstream toward the slight constriction 16. Nozzles 18 in the secondary contacting area, section 3, should be mounted on the side of the vessel and pointed up stream as shown. Furthermore, if the system employs cleaning nozzles 22 for the demisters, they should be mounted upstream of demisters 20 and pointed toward demisters 20 to remove deposits which generally build up on the leading edge of the demister.

Figure 2:
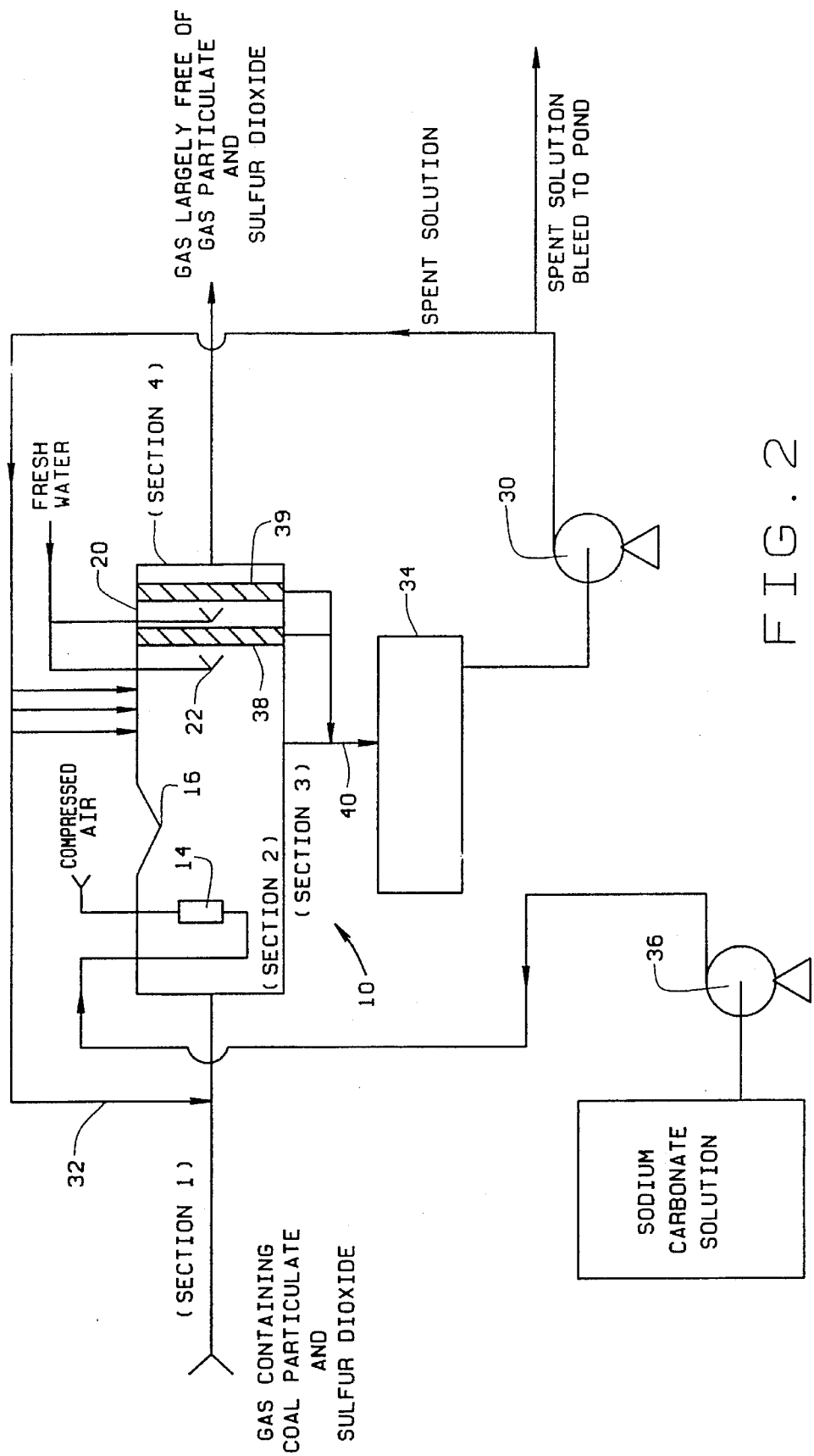
FIG. 2 is a block diagram illustrating the method of the present invention.

The number of nozzles and atomizers used in each section is optional. The number of nozzles employed in the system illustrated in FIG. 1 depends upon the geometry of both the spray pattern formed by the nozzles and by the exact geometry of the walls of the vessel used. However, in all cases, the nozzle spray patterns must contact the entire gas stream as evenly as possible. This is particularly important for the atomizers 14 in section 2.

A diagram of a method of the preferred embodiment is shown in FIG. 2. A flue gas, containing coal particulates and sulfur dioxide from coal processing, is conditioned prior to release into the atmosphere. The flue gas, prior to entering into the apparatus proper, is sprayed with recirculated solution. This corresponds to section 1 of FIG. 1, or "presaturation". As shown, recirculated solution is pumped by a recirculation pump 30 for presaturation. At this point in the apparatus, the duct work 32 is sloped or vertical to allow the sprayed solution to flow into the spent solution surge tank 34 without the need for additional drainage.

After saturation with water in the duct work, the gas enters the system proper 10 and is contacted in the primary contacting area or section 2 (FIG. 1). Fresh sodium carbonate solution is pumped via the fresh solution pump 36 and combined with compressed air through the twin fluid atomizers 14. At this stage the gas is contacted with ultrafine mists of absorption solution created by the twin fluid atomizers.

As also shown in FIG. 1, constriction 16 is orientated to allow drainage directly into the section 3, the secondary contacting vessel. This arrangement eliminates additional drainage. After constriction 16, the gas is contacted by usable, recirculated spent absorption solution via recirculation pump 30. After this section, the gas flows through a demister 20 shown as two sets of chevrons 38, 39. The gas is demisted and then discharged.

The unusable spent absorption solution, in this case containing sodium sulfite, sodium biocarbonate, sodium sulfate, and traces of sodium carbonate, along with collected coal particles, is bled out of the process via recirculation pump 30 and discharged to a pond (not shown). It should be noted that a drainage system 40 inside secondary contacting area, section 3, recovers all the solution from the presaturations sprays, atomizing sprays, the second contacting sprays, and the demister. Fresh water, as shown, is used to wash demisters 20 and provides makeup water to replace water lost in the presaturation section.

As illustrated in FIG. 2, the preferred embodiment uses only two pumps 30, 36. Clearly, more pumps could be used if needed. For instance, a separate pump could be provided to pump the discharged material into the pond. Furthermore, separate pumps could be used to recirculate solution back to the presaturation area or the secondary contacting stages.

The preferred embodiment can use a Kellogg-Weir scrubber or a similar kind of device having several stages of gas contacting provided by nozzles mounted on the walls of the secondary contacting section to spray the recirculated solution in a crossflow pattern. Such devises are disclosed in U.S. Pat. Nos. 3,948,608, 4,102,982, 4,269,812 and 4,343,771 to Edwards et al.

The preferred embodiment also uses a single drain system 40 in section 3, the secondary contacting area. One drain in section 3, with satisfactory duct work configured as shown in FIGS. 1 and 2, along with proper positioning of presaturation nozzles 12 and constriction 16, allows for proper water collection.

The preferred embodiment, illustrated in FIG. 2, is designed for removing sulfur dioxide and coal particulates from a gas using a solution of sodium carbonate as the gaseous pollutant absorption agent. However, a different absorption agent, such as sodium hydroxide, could be used to absorb the same or different gaseous pollutants. As designed, the spent solution is regenerated by removing particulates and thereby regenerating the absorption agent. However, when using sodium hydroxide as the absorption agent, it should be noted that regeneration produces sulfuric acid as a byproduct.

Control of the system is accomplished in several ways. One method for controlling the system is to set the inlet flow rate of fresh solution based upon the pH of the spent solution in the spent solution surge tank 34 or flowing from the tank. The outlet flow rate of the spent solution to the pond is then adjusted to be equal to the inlet flow rate. The flow of the spent solution to the pond is maintained at a desired rate so as to maintain a certain particulate slurry concentration, to facilitate the pumping, or to maintain a known salt solution concentration so as to prevent precipitation of salts in the piping. It will be appreciated that the pond (not shown) may be an evaporation pond of limited liquid capacity so that the outflow can be maintained to concentrate the water to the extent that pumping problems or precipitation do not occur in the piping. Moreover, the concentration within the piping and pond are controlled so as to minimize evaporative loads on the pond.

Figure 3:
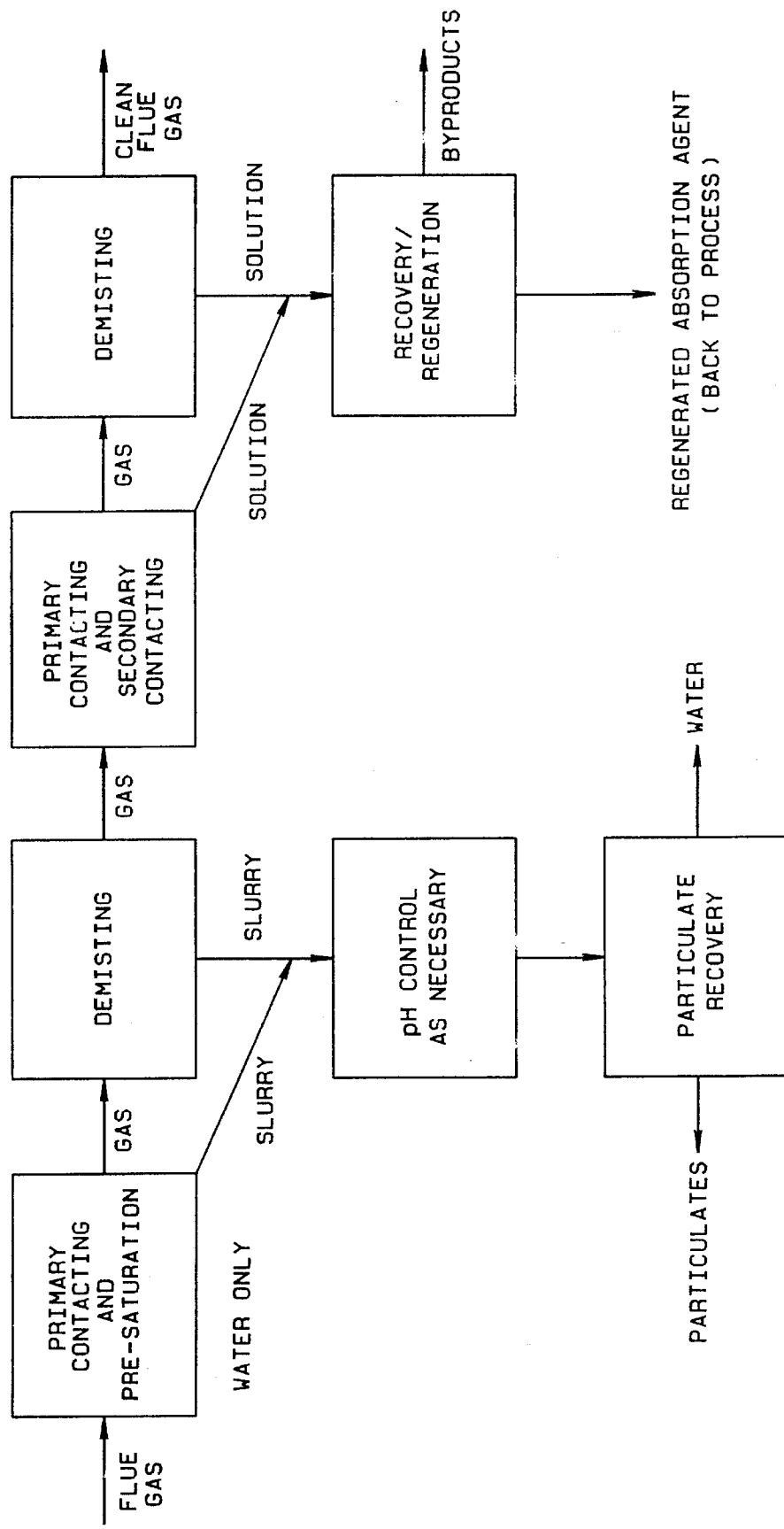
FIG. 3 is a block diagram illustrating an alternative method of the present invention.

FIG. 3 illustrates an alternative embodiment of the method and apparatus of the present invention. The apparatus and method, as provided in FIG. 3, allow primary contacting with water only to create a slurry containing particulates. The particulates are removed and added to a slurry for particulate recovery. Free water is recovered. The gas is demisted. The particulate slurry, as well as the water, is recovered from the demister. After demisting, the gas moves to primary and secondary contacting sections which function the same as the primary and secondary contacting areas of the method illustrated in FIG. 1. During the primary contacting and secondary contacting phase, gaseous pollutants are absorbed. Spent solution is recovered and regenerated. Usable regenerated absorption agent is returned to the process. Byproducts are eliminated. For example, if sodium hydroxide is used as the absorption agent, a sulfuric acid byproduct is generated. The cleaned flue gas enters a second demisting stage and is then discharged into the environment as clean flue gas.

It will be appreciated that several changes and modifications may be made in the apparatus and method of the present invention without departing from the scope of the appended claims. For example, an appropriate absorption agent other than sodium carbonate and sodium hydroxide may be explored. Furthermore, various commercially available scubbers can be used and adapted to accommodate the apparatus and method. Therefore, the foregoing description and accompanying drawings should be viewed as illustrative only and not in a limiting sense.

We claim:

1. A method of removing coal particulates and sulfur oxides from a gas stream comprising the steps of:

cooling and saturating the gas stream to the water vapor-gas dew point temperature with a coarse spray of a recirculated solution and containing an absorption agent having a droplet size of approximately 100 microns;

cocurrently contacting the cooled and saturated gas stream with an ultrafine mist of fresh solution containing an absorption agent, the ultrafine mist having a majority of mist droplets of less than 50 microns in diameter by using at least one twin fluid atomizer;

constricting said gas stream;

spraying said constricted gas stream with a coarse spray of recirculated solution containing said absorption agent, said coarse spray having a mist droplets of approximately 100 microns in diameter; and directing said gas stream to a demister and demisting said gas stream.

2. The method of claim 1 further comprising:

collecting excess solution used during the step of saturating the gas stream;

collecting excess solution from the step of contacting the cooled and saturated gas with an ultra fine mist solution;

recirculating said collected excess solutions;

discharging unusable spent excess solution; and controlling the rate of treatment of the gas stream based upon the rate of flow of the discharged unusable spent excess solution.

3. The method of claim 1 wherein said absorption agent is sodium carbonate.

4. The method of claim 1 wherein said absorption agent is sodium hydroxide.

5. The method of claim 1 further comprising the step of washing the demister with water to clean the demister and to add water to the recirculated solution.

6. The method of claim 1 wherein the constriction of the gas stream results in a pressure drop of two inches water column or less.

7. A method of removing particulate and sulfur oxides from a gas stream comprising the steps of: saturating the gas stream with a recirculate absorption solution to saturate the gas stream to the dew point temperature of the water vapor-gas mixture and remove particulates and sulfur oxides from the gas stream cocurrently contacting the cooled and saturated gas stream with an ultrafine mist of a fresh absorption solution, said ultrafine mist having an average droplet size of approximately twenty (20) microns;

directing said gas stream through constricted area;

directing said gas stream to a secondary contacting area;

where it is contacted with a coarse mist of recirculated absorption solution;

directing the gas stream to a demister;

demisting said gas stream prior to discharge of said gas stream into the environment;

collecting spent absorption solution;

controlling the rate of input of fresh solution by monitoring the pH of spent absorption solution and adjusting the rate based upon said pH; and controlling the rate of output of spent solution by monitoring the rate of fresh solution input.

8. The method of claim 7 further comprising a step of demisting said gas stream after the step of presaturating the gas stream.

9. The method of claim 7 wherein said absorption agent is sodium carbonate.

10. The method of claim 7 wherein said absorption agent is sodium hydroxide.

11. The method of claim 7 further comprising the step of recovering said absorption solution.

12. A process for removing particulate matter and sulfur oxides from a gas stream comprising the steps:

Saturating the gas stream with a recycled solution containing an absorption agent to cool the gas stream and to saturate the gas stream to the dew point temperature of a water vapor-gas mixture; cocurrently contacting the cooled and saturated gas stream with an ultrafine mist of fresh solution containing the absorption agent, the ultrafine mist having an average mist droplet size less than fifty (50) microns;

directing the gas stream to a constricted area to create a constricted gas stream recovering spent solution from the constricted area;

treating the gas stream with a coarse spray of recovered solution to remove particulate matter and sulfur oxides, said coarse spray having an average mist droplet size of approximately 100 microns;

demisting the gas stream; and releasing the demisted gas stream into the environment.

* * * * *